US010045352B2

(12) United States Patent
Yue et al.

(10) Patent No.: US 10,045,352 B2
(45) Date of Patent: Aug. 7, 2018

(54) CHANNEL ESTIMATION IN LARGE SCALE MIMO SYSTEMS USING ITERATIVE LOCATION BASED SPATIAL FILTERING

(71) Applicant: Futurewei Technologies, Inc., Plano, TX (US)

(72) Inventors: Guosen Yue, Edison, NJ (US); Xiao-Feng Qi, Westfield, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 95 days.

(21) Appl. No.: 14/994,538

(22) Filed: Jan. 13, 2016

(65) Prior Publication Data
US 2017/0201976 A1    Jul. 13, 2017

(51) Int. Cl.
*H04W 72/04* (2009.01)
*H04W 4/02* (2018.01)
(Continued)

(52) U.S. Cl.
CPC ........ *H04W 72/048* (2013.01); *H04B 7/0413* (2013.01); *H04B 7/086* (2013.01); *H04L 67/303* (2013.01); *H04W 4/025* (2013.01)

(58) Field of Classification Search
CPC ... H04W 72/048; H04W 4/025; H04W 60/04; H04W 4/22; H04W 64/003;
(Continued)

(56) References Cited

U.S. PATENT DOCUMENTS

2007/0177539 A1* 8/2007 Nakano .................. H04W 74/06
                                                                370/328
2010/0278141 A1* 11/2010 Choi-Grogan .......... H04W 4/90
                                                                370/331
(Continued)

FOREIGN PATENT DOCUMENTS

| CN | 102832985 A | 12/2012 |
| CN | 104601499 A | 5/2015 |
| WO | 2015169358 A1 | 11/2015 |

OTHER PUBLICATIONS http://www2.engr.arizona.edu/~dial/ece531/Spatial_Transforms.pdf, University of Arizon, published Fall 2005.*
(Continued)

*Primary Examiner* — Kwang B Yao
*Assistant Examiner* — Hardikkumar Patel
(74) *Attorney, Agent, or Firm* — James Harrison

(57) ABSTRACT

The disclosure relates to technology for iterative localization and channel estimation in a communication system. A radio network node detects user location information from user equipment in a geographic region, where the geographic region includes a location cluster having multiple location levels. A location signature profile is formed for each level based on the location signature of a corresponding location level in the cluster, and a filter is generated for each level based on the location signature. Upon application of the filter that matches the location level of the location user information, the channel is estimated and the user location information is updated based on the channel estimation. The
(Continued)

process is repeated until the user location information converges with a preselected convergence value.

24 Claims, 14 Drawing Sheets

(51) Int. Cl.
*H04B 7/08* (2006.01)
*H04B 7/0413* (2017.01)
*H04L 29/08* (2006.01)

(58) Field of Classification Search
CPC ........... H04W 72/082; H04W 36/0083; H04W 36/30; H04W 4/02; H04B 7/0413; H04B 7/086; H04L 67/303; H04Q 7/20; G01S 5/0205; H04J 13/0062; G08B 13/24

See application file for complete search history.

(56) References Cited

U.S. PATENT DOCUMENTS

| | | | |
|---|---|---|---|
| 2011/0110304 A1* | 5/2011 | Kuchi | H04L 5/0023 370/328 |
| 2013/0260798 A1* | 10/2013 | Moshfeghi | H04W 4/029 455/456.5 |
| 2014/0307594 A1 | 10/2014 | Marzetta et al. | |
| 2016/0066137 A1* | 3/2016 | Kulkarni | H04W 4/02 455/456.1 |
| 2016/0087769 A1* | 3/2016 | Wild | H04B 7/065 370/329 |

OTHER PUBLICATIONS

Thomas L. Marzetta, "Noncooperative Cellular Wireless with Unlimited Numbers of Base Station Antennas", IEEE Transactions on Wireless Communications, vol. 9, No. 11, Nov. 2010.
Jose, et al., "Pilot Contamination and Precoding in Multi-Cell TDD Systems", IEEE Transactions on Wireless Communications, vol. 10, No. 8, Aug. 2011.

* cited by examiner

CHANNEL ESTIMATION IN LARGE SCALE MIMO SYSTEMS USING ITERATIVE LOCATION BASED SPATIAL FILTERING

BACKGROUND

A wireless radio transceiver, also known as User Equipment (UE), mobile station, wireless terminal and/or mobile terminal is enabled to communicate wirelessly in a wireless communication network, sometimes also referred to as a cellular radio system or radio network. The communication may be made, e.g., between two wireless radio transceivers, between a wireless radio transceiver and a wire connected telephone and/or between a receiver and a server via a Radio Access Network (RAN) and possibly one or more core networks.

The wireless communication network covers a geographical area which is divided into cell areas, with each cell area being served by a radio network node, or base station, e.g., a Radio Base Station (RBS), which in some networks may be referred to as transmitter, eNodeB (eNB), NodeB, or B node, depending on the technology and terminology used. The network nodes may be of different classes, e.g., macro eNodeB, home eNodeB or pico base station, based on transmission power and thereby also cell size.

In some radio access networks, several radio network nodes may be connected, e.g., by landlines or microwave, to a Radio Network Controller (RNC), e.g., in Universal Mobile Telecommunications System (UMTS). The RNC, also sometimes termed Base Station Controller (BSC), e.g., in Global System for Mobile Communications (GSM), may supervise and coordinate various activities of the plural radio network nodes connected thereto. In 3rd Generation Partnership Project (3GPP) Long Term Evolution (LTE), radio network nodes, which may be referred to as eNodeBs or eNBs, may be connected to a gateway, e.g., a radio access gateway, to one or more core networks.

Systems beyond 3G mobile communication, e.g., 3GPP LTE, offer high data rate by employing Multiple-Input and Multiple-Output (MIMO) with Orthogonal Frequency Division Multiplexing (OFDM) access scheme at the UE receiver. A receiver, before being able to receive data from a serving radio network node, has to perform channel estimation. The channel estimation is based on a reference signal emitted by the radio network node. The quality of such channel estimates is important to support very high data rates, in particular in highly frequency- and time-selective channel (or doubly-selective channel) conditions. However, many techniques employed to perform channel estimation result in errors for high data rates.

BRIEF SUMMARY

In one embodiment, there is a method for channel estimation in a communication system between a user equipment and a radio network node, including (a) detecting user location information, at the radio network node, from one or more user equipment in a geographic region, the geographic region comprising a location cluster of one or more location levels; (b) forming a location signature profile for each of the one or more location levels based on location signatures from a corresponding one of the one or more location levels in the location cluster; (c) generating a filter for each of the one or more location levels based on the location signatures from a corresponding one of the one or more location levels in the location cluster; (d) estimating a channel by applying the filter based on the location signatures of the one or more levels in the location cluster that matches the one or more location levels of the location user information; and (e) updating the user location information based on the estimated channel, and iterating (b)-(e) until the user location information converges with a predetermined convergence value.

In another embodiment, there is a node for channel estimation in a communication system, including a memory storage comprising instructions; and one or more processors coupled to the memory that execute the instructions to: (a) detect user location information, at the radio network node, from one or more user equipment in a geographic region, the geographic region comprising a location cluster of one or more location levels; (b) form a location signature profile for each of the one or more location levels based on location signatures from a corresponding one of the one or more location levels in the location cluster; (c) generate a filter for each of the one or more location levels based on the location signatures from a corresponding one of the one or more location levels in the location cluster; (d) estimate a channel by applying the filter based on the location signatures of the one or more levels in the location cluster that matches the one or more location levels of the location user information; and (e) update the user location information based on the estimated channel, and iterate (b)-(e) until the user location information converges with a predetermined convergence value.

In still another embodiment, there is a non-transitory computer-readable medium storing computer instructions channel estimation in a communication system between a user equipment and a radio network node, that when executed by one or more processors, perform the steps of (a) detecting user location information, at the radio network node, from one or more user equipment in a geographic region, the geographic region comprising a location cluster of one or more location levels; (b) forming a location signature profile for each of the one or more location levels based on location signatures from a corresponding one of the one or more location levels in the location cluster; (c) generating a filter for each of the one or more location levels based on the location signatures from a corresponding one of the one or more location levels in the location cluster; (d) estimating a channel by applying the filter based on the location signatures of the one or more levels in the location duster that matches the one or more location levels of the location user information; and (e) updating the user location information based on the estimated channel, and iterating (b)-(e) until the user location information converges with a predetermined convergence value.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures for which like references indicate like elements.

DETAILED DESCRIPTION

The disclosure relates to technology for iterative localization and channel estimation in a communication system. A radio network node detects user location information from user equipment in a geographic region, where the geographic region includes a location duster having multiple location levels. Location levels may be different location regions within a location duster. A location signature profile is formed for each level based on the location signature of a corresponding location level in the cluster, and a filter is generated for each level based on the location signature. Upon application of the filter that matches the location level of the location user information, the channel is estimated and the user location information is updated based on the channel estimation. The process is repeated until the user location information converges with a preselected convergence value.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications and equivalents of these embodiments, which are included within the scope and spirit of the subject matter as defined by the appended claims. Furthermore, in the following detailed description of the present subject matter, numerous specific details are set forth in order to provide a thorough understanding of the present subject matter. However, it will be clear to those of ordinary skill in the art that the present subject matter may be practiced without such specific details.

Figure 1:
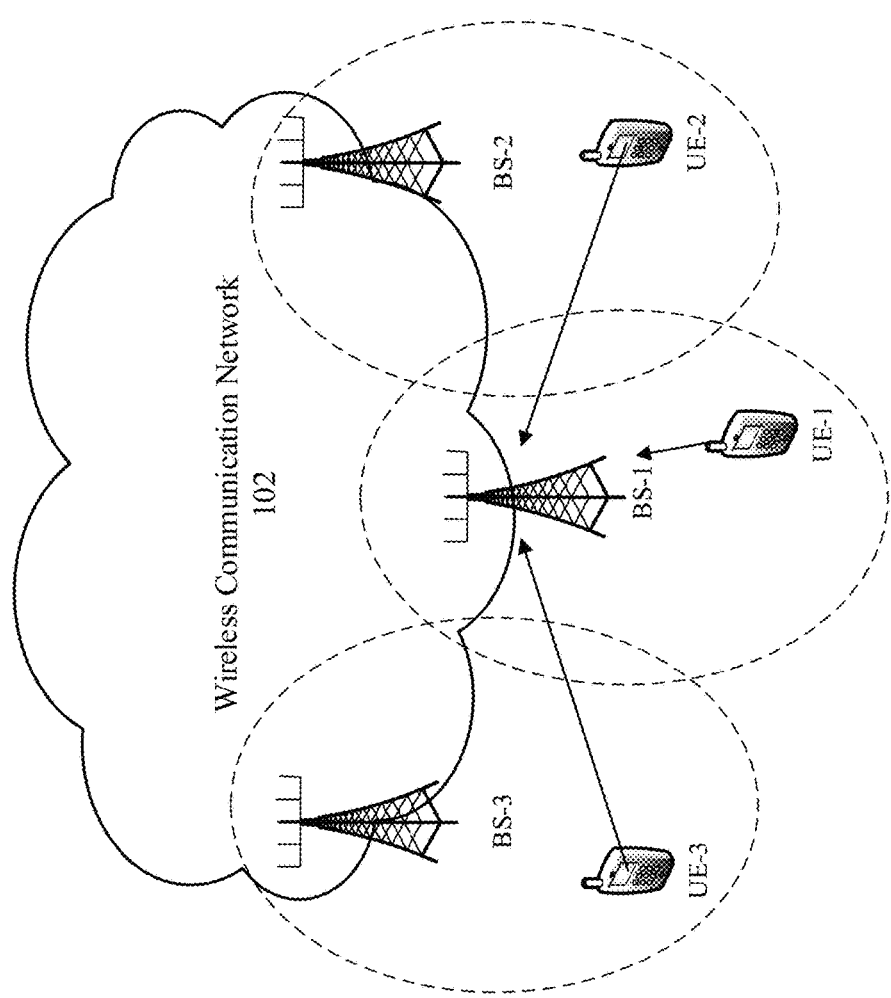
FIG. 1 illustrates a wireless communications network.

FIG. 1 illustrates a wireless communications network. As shown, the wireless communication network 102 may include one or more user equipment (UE) UE-1, UE-2 and UE-3, and one or more base stations (BS) BS-1, BS-2 and BS-3 capable of communicating with the UEs, along with any additional elements suitable to support communication between UEs or between a UE and any other communication devices (not shown) in the wireless communication network 102.

The wireless communication network 102 may be any wireless network based on radio technologies, such as 3GPP LTE, LTE-advanced, E-UTRAN, UMTS, OFDMA. It is appreciated that the radio technologies are non-limiting and that any other well-known radio technology may be employed. Moreover, the wireless communication network 102 may be configured to operation according to the Time Division Duplex (TDD) and/or the Frequency Division Duplex (FDD) principles. As understood, radio signals are sent and received in the wireless communication network 102 in order to communicate wirelessly using UEs and BSs.

The base stations BSs may include, for example, a multiple antenna array, which may be configured for massive or large-scale Multiple Input Multiple Output (MIMO) communications. The antenna arrays may also include antenna elements, explained below with reference to FIG. 2. Additionally, the UEs may comprise a wireless communication terminal, mobile phone, personal digital assistance, wireless platform, a tablet, portable communication device, laptop, computer, relay node or any other kind of device configured to communicate wirelessly with the base stations BS-1, BS-2 and BS-3. Further explanation of the base stations BSs and user equipment UE may be found with reference to the disclosure related to FIG. 10, below.

While massive MIMO may dramatically improve throughput of wireless communication systems by use of the multiple antenna arrays, one of the negative effects is pilot signal contamination. Pilot signal contamination is caused by lost or lack of training sequence orthogonality between cells. More specifically, a massive MIMO enabled radio network node estimates the radio channel from user equipment by correlating the received signal with a known pilot signal transmitted by the user equipment. These pilot signals are made orthogonal to each other. This means that the result of correlation performed by the radio network node during training will only contain a systematic response from a desired link of the user equipment transmitting the pilot used in the correlation.

However, there are only a limited set of orthogonal pilot signals available. This means that the same pilot signal has to be reused to provide enough training time and accurate channel estimations. For example, in the illustration of FIG. 1, user equipment UE-1, UE-2 and UE-3 are served by base stations BS-1, BS-2 and BS-3, respectively, where the same pilot signal is assigned to each of the user equipment UEs and transmitted at the same time frequency resources. This will cause increased pilot contamination within the cell, which will deteriorate the signal quality and thereby also the signaling throughput within the wireless communication system.

Figure 2:
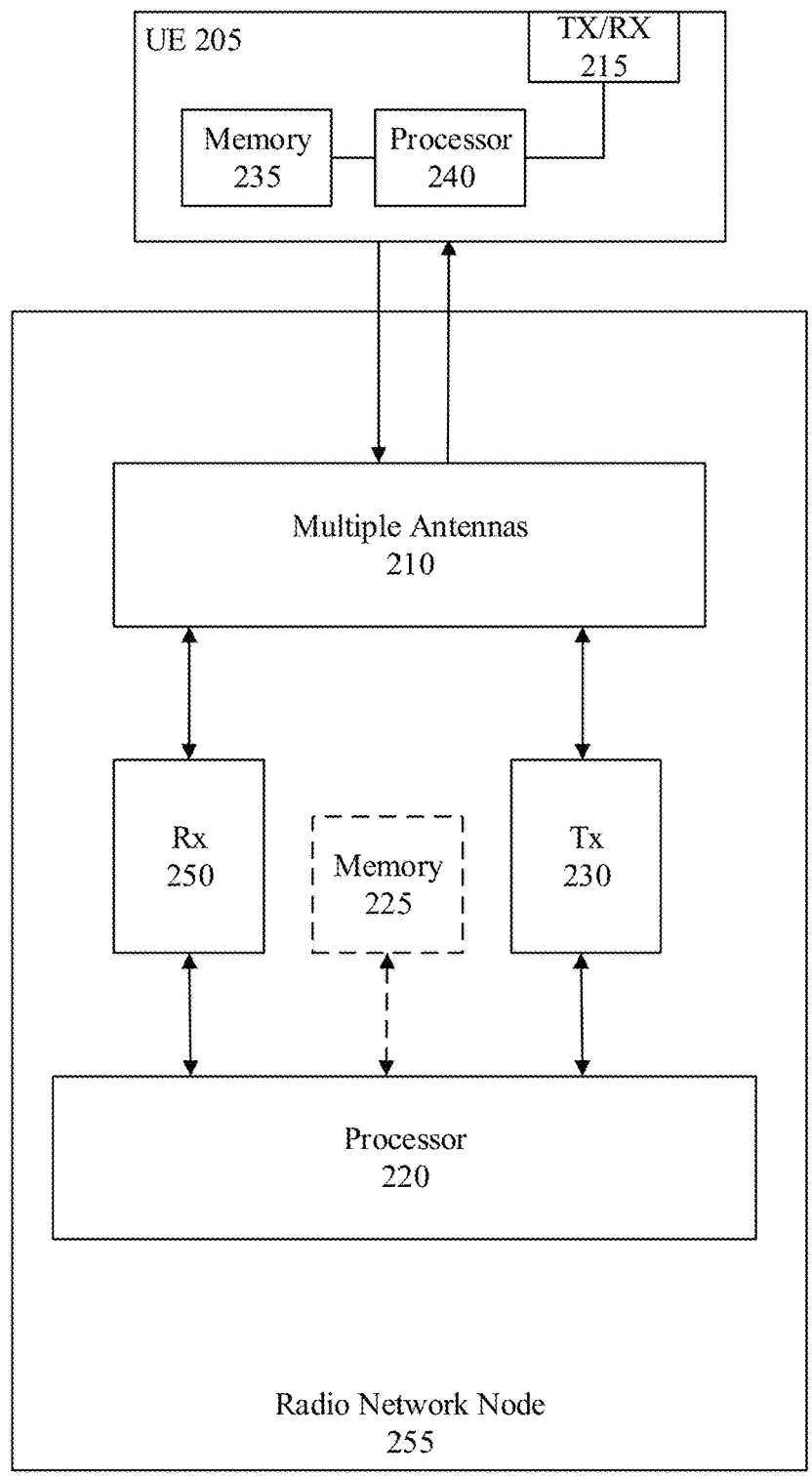
FIG. 2 illustrates an embodiment of a radio network node and a user equipment in a wireless communication system.

FIG. 2 illustrates an embodiment of a radio network node 255, for channel estimation of a channel used for wireless signal communication between a user equipment and the radio network node 255 in a wireless communication system. Although not depicted, it is appreciated that the communication system may also include or form any type of network, such as the Internet.

The user equipment 205 may include a processor 240, a memory 235, a transceiver 215, and an antenna (not shown). In particular embodiments, some or all of the functionality described above as being provided by mobile communication devices or other forms of UE 205 may be provided by the UE processor 240 executing instructions stored in the memory 235. Alternative embodiments of the UE 205 may include additional components that may be responsible for providing certain aspects of the UE's functionality, including any of the functionality necessary to support the embodiments of the present disclosure.

The radio network node 255 comprises multiple antennas 210 configured for beamforming, spatial multiplexing and MIMO transmission. The multiple antennas 210 may include, for example, a multitude of antenna elements, mounted at a distance from each other such that at least some of the antenna elements are able to receive the same signal from the user equipment 205. The antenna elements may be 1-D, 2-D, etc.

The radio network node 110 is further configured for wireless communication in a wireless communication system and to perform the method and processes according to the disclosed embodiments, and in particular, for channel estimation of a channel used for wireless signal communication between a UE 205 and the radio network node 205 and to determine location signatures of the UEs in the wireless communication system. The wireless communication network may be based, for example, on 3GPP LTE. Further, the wireless communication system 100 may be based on FDD or TDD in different embodiments. The radio network node 255 may comprise an evolved NodeB (eNodeB) according to some embodiments.

In one embodiment, the radio network node 255 comprises a receiver 250 and transmitter 230 (together, a transceiver), configured for receiving a pilot signal from the user equipment UE 205, and a wireless signal from one or more other UEs 205 (not shown). The pilot signal of the UE 205 may be comprised in a set of orthogonal pilot signals coordinated between the radio network node 255 and neighbor network nodes (not shown).

Further, the radio network node 255 includes a processor 220 configured for spatial analysis of the received signals and selecting pilot signals from the UE 205, based on the spatial analysis. The processor 220 is also configured for determining an angle of arrival for the selected pilot signals and to estimate the channel based on the received pilot signal and/or location information provided by the UE 205 or determined by radio network node 255 using readily available techniques. Additionally, the processor 220 may be configured for spatial analyzing the received signals by comparing the received signal strength with a predetermined threshold value, and may in further addition be configured for selecting the signals having a signal strength exceeding the predetermined threshold value.

The radio network node 255 may also include an optional memory 255 one or more memories), which may comprise a physical device utilized to store data or a program, i.e., a sequence of instructions, on a temporary or permanent basis. According to some embodiments, the memory 525 may comprise integrated circuits comprising silicon-based transistors. Further, the memory 525 may be volatile or non-volatile.

It will become apparent from the description that follows that all or some of the above and below described methods and processes may be performed in the radio network node 255 and may be implemented through the one or more processors 220, together with a computer program product for performing at least some of described methods and processes.

Figure 3:
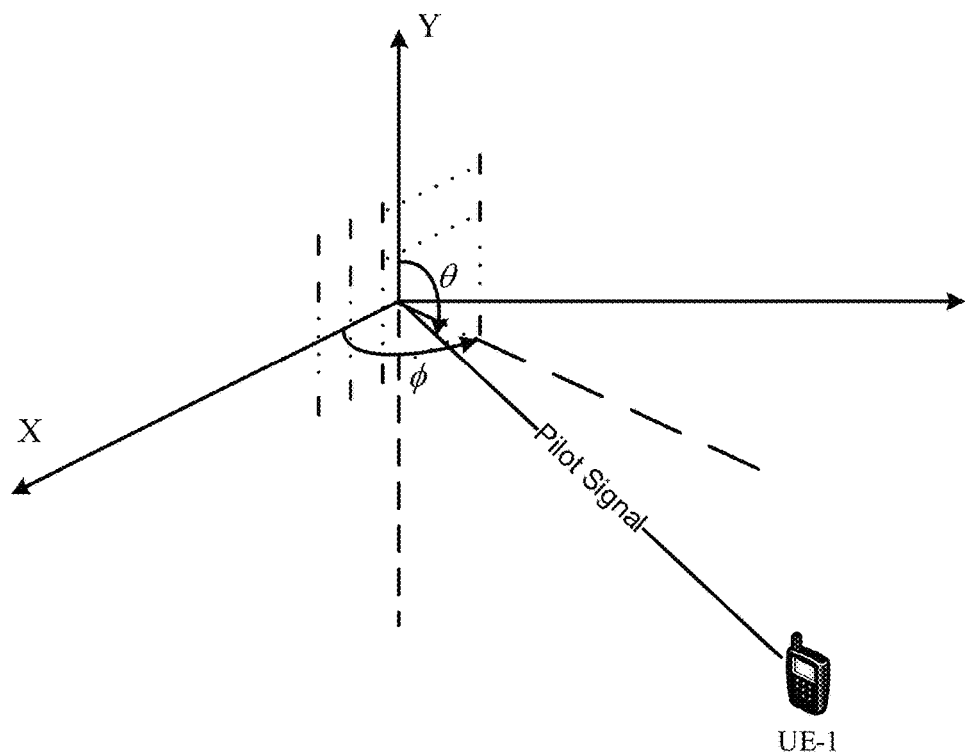
FIG. 3 illustrates an array of antenna elements and an incident signal.

FIG. 3 illustrates an array of antenna elements and an incident signal. Incident signals may include, for example, pilot signals. In a mobile communication system, array antennas can be used at the base station to enhance the radio reception quality by employing beamforming in both uplink and downlink. A downlink describes a link that may be used for the transmission path from the radio network node or base station BS to the user equipment UE, whereas the expression uplink may be used for the transmission path in the opposite direction, i.e., from the user equipment UE to the base station BS.

For several reasons, it is desirable to be able to estimate the direction of arrival (DOA) of incoming signals, including pilot signals, to the antenna array with good accuracy. In the depicted embodiment, $\phi$ refers to the angle of arrival in the horizontal direction and $\theta$ refers to the angle of arrival in the vertical direction. These angles can be measured using several well-known techniques. For example, a classical estimation method for DOA, the classical beamformer method, was presented in J. C. Liberti and T. S. Rappaport "Smart antennas for wireless communications" chapter 9, Prentice Hall, Upper Saddle River, N.J., 1999. The beamformer calculates the resulting power from the input signal for a set of beams, and selects the pointing direction of the beam with highest power as the estimated direction of arrival. The drawback is that to obtain a reasonable accuracy, the number of beams must be large, which leads to high complexity.

There is one class of direction-of-arrival estimators which uses the correlation matrix of the input signal. For instance, Capon's minimum variance method utilizes the correlation matrix of the input signal to minimize the interference under the constraint that the signal power is constant. This method obtains a higher resolution than the classical beamformer method but also with higher complexity. More sophisticated methods such as the subspace methods MUSIC (Multiple User Signal Characteristic) and ESPRIT (Estimation of Signal Parameter via Rotational Invariance Technique) contain arithmetic that calculates the eigen decompositions of the correlation matrix of the signal. This was recited in the European patent application EP 1253434, "Method for estimating a direction of arrival", presented by L. Brunei and A. Ribeiro Dias, in Dec. 30, 2002.

Other techniques such as DFT steering, minimum variance distortionless response (MVDR) may also be used. However, it is appreciated that the above DOA estimation techniques are examples and non-limiting, and that any known technique may be used for DOA estimation in the present disclosure. Moreover, the methodologies may be employed in systems using 1D or 2D antenna arrays.

Figure 4:
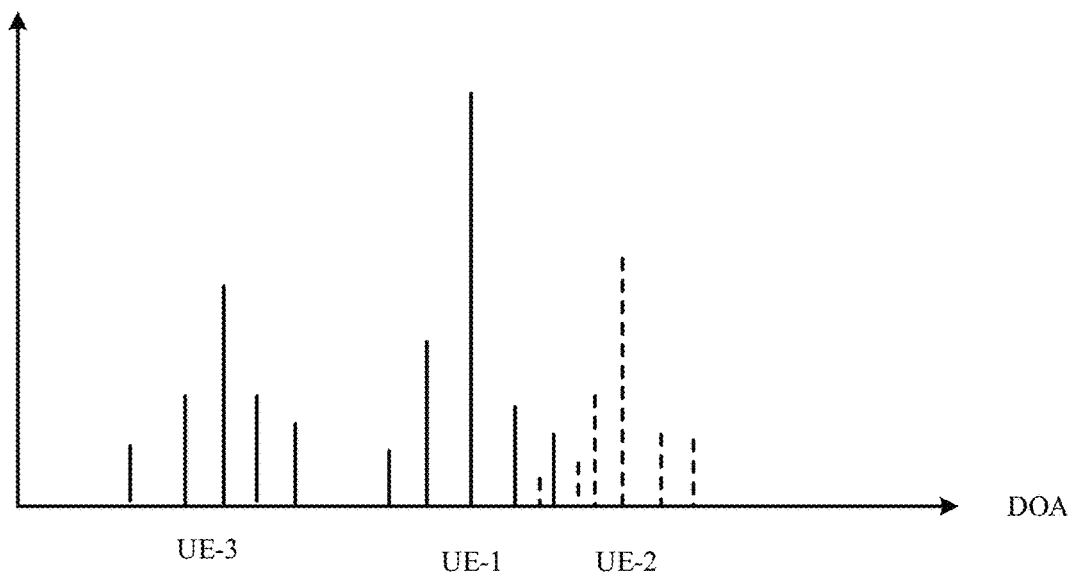
FIG. 4 is a representation of location signatures from user equipment to a base station in accordance with FIG. 1.

As explained above, when pilot signals are reused in neighboring cells, channel estimation performance degrades significantly, causing pilot contamination. FIG. 4 illustrates a representation of location signatures from user equipment to a base station in accordance with FIG. 1. As illustrated, since the user equipment UEs reuse the same pilot signal, pilot contamination occurs. For example, user equipment UE-1 and UE-2 show location (in the example, DOA) signatures with contamination (illustrated as "overlapping" DOA signatures). The estimations provided in the example illustration are determined using, for example, ESPRIT, MUSIC, etc.

Figure 5A:
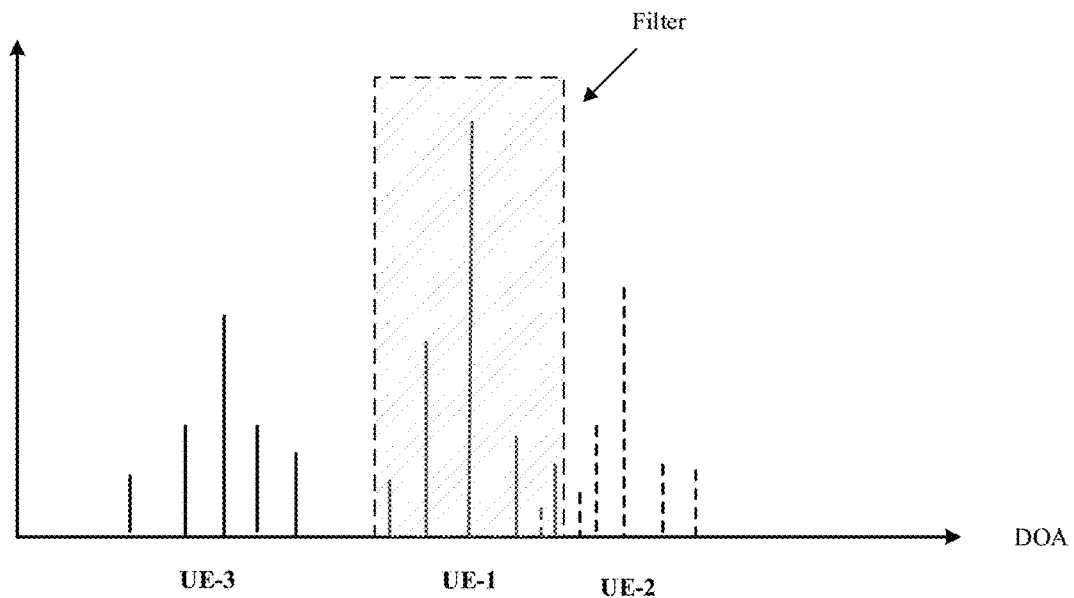
FIG. 5A illustrates the graph of FIG. 4 with application of location based filtering.

In order to improve the issue of degradation, such as pilot contamination, the present disclosure employs, in one embodiment, a location based channel estimation method using a filter. FIG. 5A illustrates the graph of FIG. 4 with application of location based filtering. The filter is depicted by the shaded rectangular box with dashed perimeter lines.

In general, a channel estimation filter is important in contesting the effects of noise and interference, which otherwise corrupt the channel estimate. In the embodiments that follow, the filtering is a spatial domain filter that is applied to direction of arrival (DOA) signatures. However, it is appreciated that any well-known filter may be used and applied to any location based signature. That is, the embodiments describing DOA signatures and spatial domain filtering are non-limiting examples used for explanatory purposes.

In the example, the transmitting device (e.g., UE-1) is known by the base station BS-1 to be within a geographic location that is being served by a particular cell (FIG. 1). Properties of the location signatures (e.g., DOA signatures) are therefore similar for the UEs located in the same geographic region. For example, UE-1, UE-2 and UE-3 (FIG. 1) are located in different geographic locations and thus have different DOA signatures. Applying the localization process, the location (or approximate location) of UE-1 may be determined, along with a corresponding DOA signature and filter (e.g., spatial domain filter). The filter may then be applied to filter out signals from other UEs (e.g., UE-2 and UE-3).

In one embodiment, as depicted, the DOA signatures received by each of the UEs are clustered into DOA signatures for UE-1, UE-2 and UE-3. These received DOA signatures may then be compared against historical information (described below) to determine how best to filter the DOA signatures.

Prior to generating and applying the filter, a database of location signatures (e.g., DOA signatures including ranges based on the properties of the DOA signatures of the served area) is created (or updated if already created). The database may be, for example, a collection of historical data regarding channel conditions and location signatures. For example, the historical data may include signal to noise plus interference ratio (SNIR), dispersion and/or temporal fading. Although the historical data is not limited by such information. The historical data may be obtained by the receiver or an antenna by observation of an uplink signal. The historical data may be stored in the base station or in a remotely located storage. Moreover, in one embodiment the database may also have DOA signatures of the lowest/finest location level, or of different localization levels/resolutions. In another embodiment, the DOA signatures may be generated offline, i.e., after the localization of a particular.

The filter may then be formed, based at least in part on the historical location signature data, to filter out interference, such as pilot contamination, and noise, such as out-band noise, from the signals generated by UE-2 and UE-3 (with the exception of the overlapping signature). That is, the desired signal (non-filtered) is from UE-1, such that the location and location signatures of UE-2 and UE-3 are not detected (filtered). Then, based on the signatures of the UE-1 location, the corresponding filter is applied to filter out the signals/noises/interference components that are orthogonal thereto (e.g., orthogonal in spatial DOA, time, etc.) to the signal of UE-1.

As illustrated in FIG. 5A, and based on the filtering, the cluster of DOA signatures for UE-3 are completely removed when the filter is applied, and the cluster of DOA signatures for UE-2 are largely removed (with the exception of the DOA signatures that are not outside of the filter). The filter may be defined as:

$$w = [w_1, \ldots, w_N]$$
$$w_k = \begin{cases} 1, & \phi_k \in \Theta \\ 0, & \phi_k \notin \Theta \end{cases},$$

where $\Theta$ is the DOA admissible set for a user based on the DOA signatures for a DOA Range $\Theta = \{\phi | \phi_{min} < \phi < \phi_{max}\}$, where $\phi_{min}$, $\phi_{max}$ are location specific (or location and localization level specific).

Figure 5B:
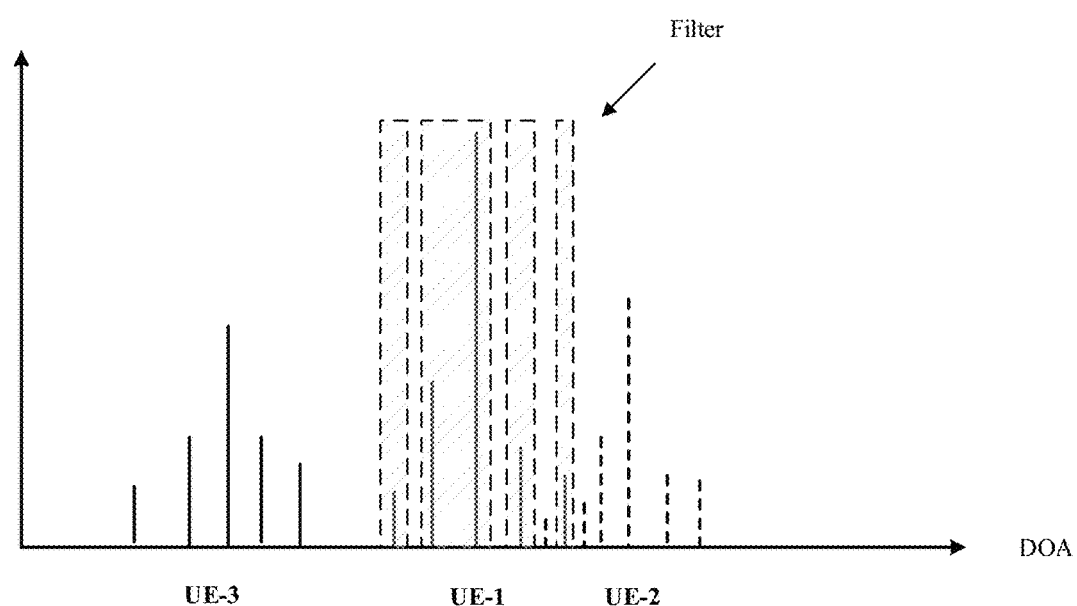
FIG. 5B illustrates the graph of FIG. 4 with application of a set of location based filtering.

FIG. 5B illustrates the graph of FIG. 4 with application of a set of location based filtering. In the embodiment, the location signatures (e.g., DOA signatures) are a range of one or more DOA signature clusters, where the clusters together form the filter. Here, the reined DOA signature and filtering counteracts the interference that results in the "overlapped" DOA signature (and in some instances the in-band noise) described with reference to FIG. 5A. For example, the filter is applied over four ranges (depicted by the four shaded rectangular boxes with dashed perimeter lines) of DOA clusters, such that each DOA signature in the range is filtered from all other signatures. Thus, as illustrated, the filter "surrounds" each DOA signature from UE-1 to thereby remove each of the DOA signatures from UE-2 and UE-3. Accordingly, the filtering using a range of DOA signatures results in improved performance, although with added complexity in the calculation. The admissible set $\Theta$ is defined as a union of smaller (i.e., smaller than the admissible set in the example above) admissible sets $\Theta = \Theta_1 \cup \Theta_2 \ldots \cup \Theta_G$, $\Theta_g = \{\phi | \phi_{g,min} < \phi < \phi_{g,max}\}$, with each set being user specific.

Figure 6:
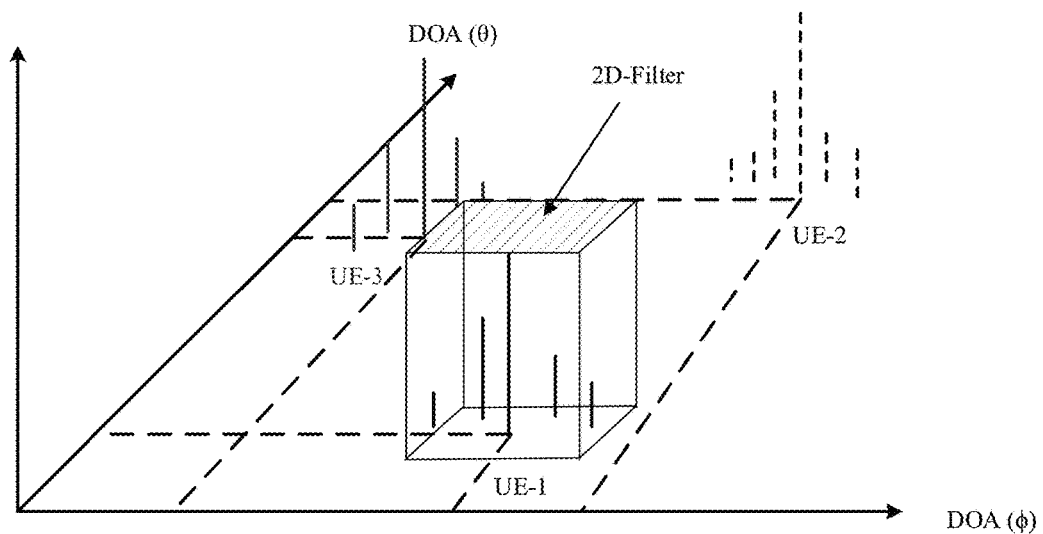
FIG. 6 is an illustration of the graph in FIG. 4 in which a 2-D filter may be applied.

The examples above use estimation methods in which a 1D antenna is employed. In the following example, a 2D antenna array employed. FIG. 6 is an illustration of the graph in FIG. 4 in which a 2D filter may be applied. By virtue of the 2D antennas, the location based signatures may have improved filtering and channel estimation performance when applying the filter. As illustrated, the DOA signature clusters for each of UE-1, UE-2 and UE-3 may now be filtered using 3 dimensional space. Thus, the bounded range for the admissible set is defined as $\Theta = \{(\phi, \theta) | \phi_{min} < \phi < \phi_{max}, \theta_{min} < \theta < \theta)_{max}\}$, where the cluster based admissible set is defined as $\Theta = \Theta_1 \cup \Theta_2 \ldots \cup \Theta_G$, $\Theta_g = \{(\phi, \theta) | \phi_{g,min} < \phi < \phi_{g,max}, \theta_{g,min} < \theta < \theta_{g,max}\}$.

The DOA signature may also be estimated as a vector subspace based channel estimation. Using this technique, the vector subspace is defined as:

$$R = U^{(r)} \Lambda^{(r)} U^{(r)H} h = U^{(r)} \Lambda^{(r)1/2} b^{(r)},$$

where R is the channel covariance, and $U^{(r)}$ is defined as a vector subspace of dimension M×r for 1D antenna array or $M^2 \times r$. Using a 2D antenna, r is the dimension of subspace of the channel vector; h, $L^{(r)}$ is the diagonal matrix of r×r for channel power gain of vector subspace; and $b^{(r)}$ is the channel gain vector of r×1 with a unit variance for each entry.

For channel estimation, the subspace $U^{(r)}$ and components $\Lambda^{(r)1/2} b^{(r)}$ are tracked to form a vector space based filter. The vector space based filter is defined as:

$$w = [w_1, \ldots, w_N]$$
$$w_k = \begin{cases} 1, & u_k \in \Theta \\ 0, & u_k \notin \Theta \end{cases},$$

wherein $\Theta$ is defined as the subspace vector admissible set for a user including the vectors $u_k$ if the user's channel has non-zero component for the vector subspace $u_k$, of the whole N dimensional vector space. If W=diag{w}, then $\hat{h}=U\hat{\Lambda}^{1/2}\hat{b}W$, where U is the unitary matrix covering the complete N dimensional vector space, and $\hat{\Lambda}^{1/2}\hat{b}$ are the estimated subspace components represented in the whole vector space.

In an alternative embodiment, for example when the user location information is not available, the base station coverage area can be applied in its place to determine the location signatures. Based on mobile device coverage, the location signatures (e.g., DOA signatures) for the mobile device, where the coverage area is based on the union of all possible users serviced by the mobile device, i.e., any location in the mobile device covered area.

The user equipment (mobile device) admissible set may then be defined as a wide range of DOA signatures, as follows. For 1D antennas, the admissible DOA set Θ is defined as:

$$\Theta_{cell}=\{\phi|\phi_{min}<\phi<\phi_{max}\} \text{ or } \Theta=\Theta_1\cup\Theta_2 \ldots \cup\Theta_G,$$
$$\Theta_g=\{\phi|\phi_{g,min}<\phi<\phi_{g,max}\},$$

where $\{(\phi_{min},\phi_{max})\}$ or $\{(\phi_{g,min},\phi_{g,max})\}$ are cell or location area specific. Moreover, when using the one DOA range bounded by $\phi_{min},\phi_{max}$, the admissible DOA set can be determined based on the sector of the mobile device, or $\phi_{min}$ and $\phi_{max}$ may be obtained as $\phi_{min}=\min_g \phi_{g,min}$ and $\phi_{max}=\max_g \phi_{g,max}$.

For 2D antennas, the range bounded admissible set $\Theta=\{(\phi, \theta)|\phi_{min}<\phi<\phi_{max}, \theta_{min}<\theta<\theta_{max}\}$, and for a cluster based admissible set $\Theta=\Theta_1\cup\Theta_2 \ldots \cup\Theta_G, \Theta_g=\{(\phi,\theta)|\phi_{g,min}<\phi<\phi_{g,max}, \theta_{g,min}<\theta<\theta_{g,max}\}$.

The filter is then created based on the mobile device specific DOA signatures, and the filter is applied for channel estimation for all users serviced in the cell of the mobile device.

Figure 7A:
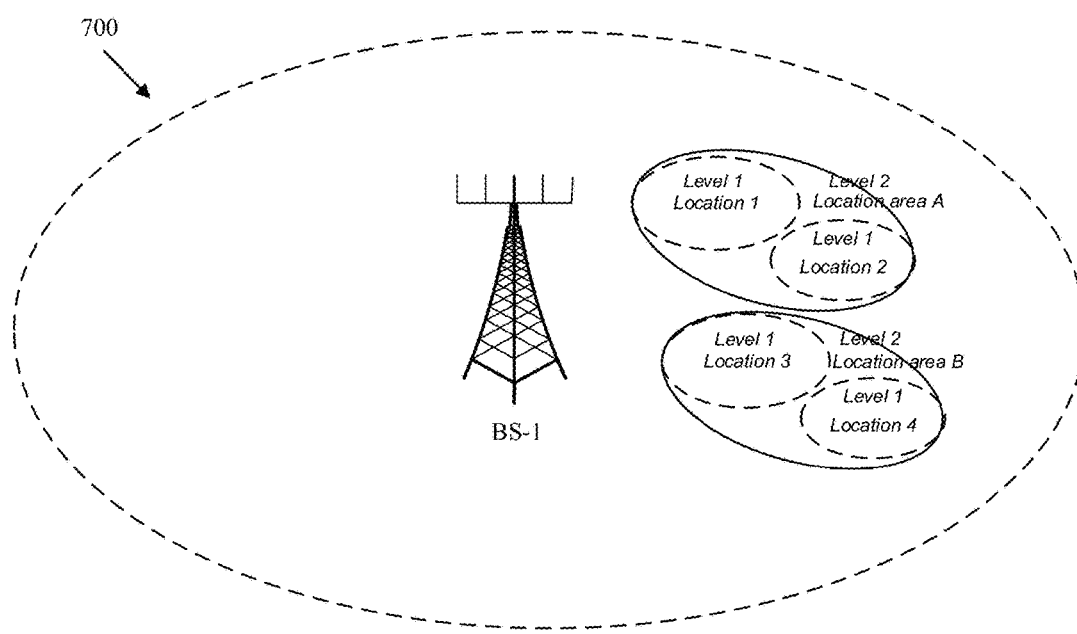
FIG. 7A illustrates a cell coverage area of a geographic region having multiple locations and levels.

FIG. 7A illustrates a cell coverage area of a geographic region having multiple locations and levels. In the illustration, base station BS-1 has a coverage area 700. Within the coverage area 700, there are multiple locations and levels in which user equipment UE may be physically located at any point in time. Thus, the coverage area 700 may be defined as having multiple location areas, each having multiple location levels. For example, a UE may be located within level 2 of location area A, which may include a level 1 with locations 1 and 2. Similarly, a UE may be located within level 2 of location B, which may include a level 1 with locations 3 and 4.

More specifically, a serving base station, for example BS-1, may not be able to determine an exact location of the UE within the coverage area 700 as a result of the location resolution. Thus, in the example, the base station BS-1 may only be able to determine the localization with a resolution of level 2 (i.e., the base station BS-1 detects that the user is in the location area A, but cannot distinguish whether the user is in location area 1 or 2 of level 1). The base station BS-1 may then apply a filter that has been generated for location A of level 2 (the "larger location area"). Filters generated for location 1 or 2 of level 1 may not be applied during this iteration, as application of either filter may inadvertently remove signals from the U Eni the correct location. A description of the filters follow.

Figure 7B:
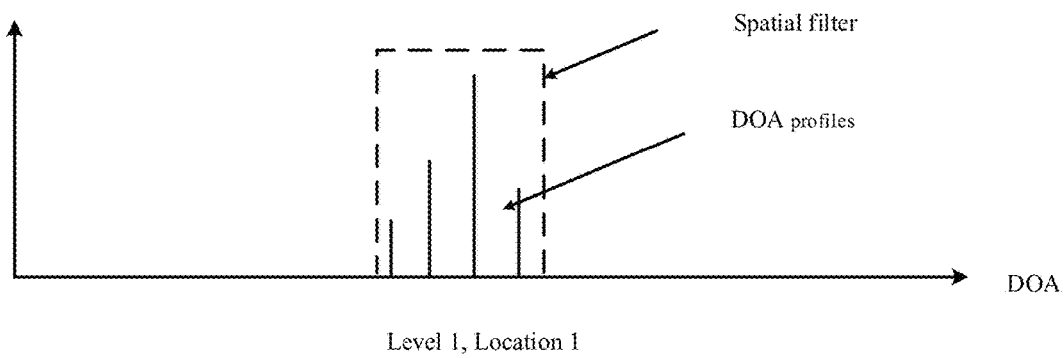
FIGS. 7B-7D illustrate spatial filters applied to location signatures in accordance with FIG. 7A.
Figure 7C:
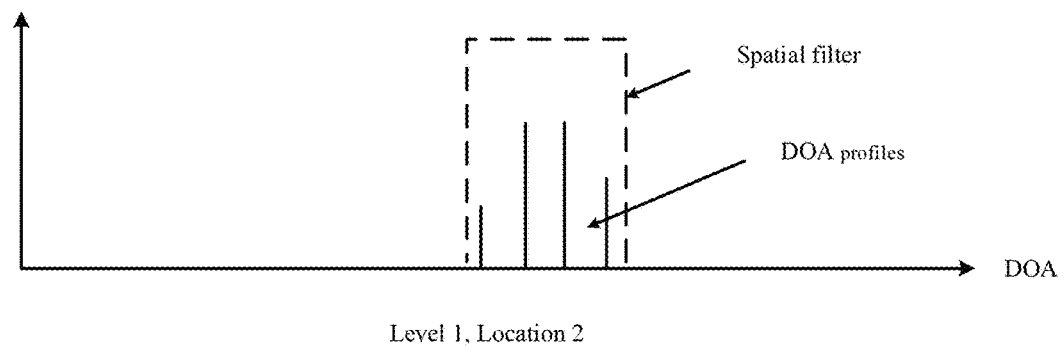
Figure 7D:
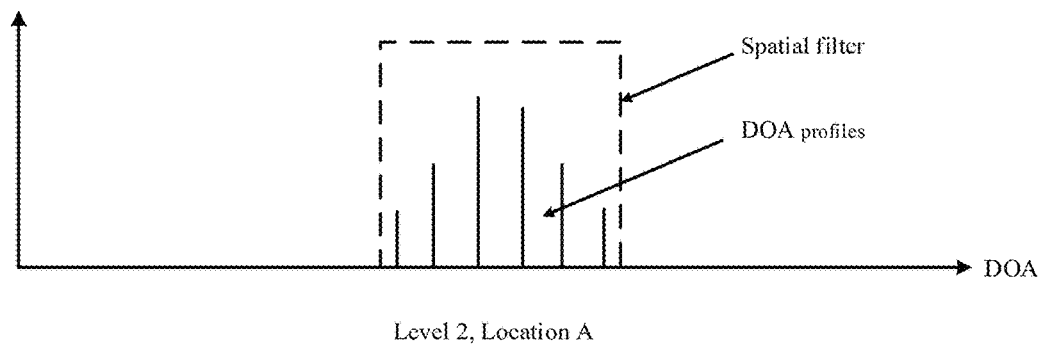

FIGS. 7B-7D illustrate spatial filters applied to location signatures in accordance with FIG. 7A. The location signatures (e.g., DOA signatures) for multiple levels may be collected using, for example, the techniques described above, and the filters for each of the multiple levels may be generated based on the location signatures from a corresponding one of the multiple location levels in the location cluster. With reference to the coverage area 700 of FIG. 7A, FIG. 7B illustrates the DOA signature profiles and spatial filter for level 1, location 1; FIG. 7C illustrates the DOA signature profiles and spatial filter for level 1, location 2; and FIG. 7D illustrates the DOA signature profiles and spatial filter for level 2, location A. The location signatures (e.g., DOA signature profiles) for multiple levels may be collected using, for example, the techniques described above, and the filters for each of the multiple levels may be generated based on the location signatures from a corresponding one of the multiple location levels in the location cluster, as described above.

Based on the received signal quality from the UEs, the localization outcome will have different accuracies. The signal quality, and therefore location, may be determined using any number of various techniques, such as an observed time difference of arrival (OTDOA), GPS or LTE positioning, collaborated multi-cell estimation, reference signal received quality (RSRP) based estimation or DOA signature based detection (fingerprint type localization) or any other well-known technique. The determined localization will be translated into a location resolution. Thus, following the example in FIG. 7A above, if a base station BS-1 cannot differentiate between two locations (for example, between location 1 and location 2 of level 1), the base station BS-1 may apply a filter associated with the location A (level 2), which is a larger area than either of location 1 or 2 of level 1.

A location based filter (i.e., spatial filter) associated with a location area and level may be obtained through training using, for example, a drive test or self-training (explained below). In one embodiment, the base station BS-1 may cluster the DOA signatures online from a high resolution to a lower resolution. For example, the spatial filters and signatures for location 1 and location 2 of level 1 may become available after long-term training and refining of the location. Based on the location signatures determined for location 1 and location 2 of level 1, additional processing may be performed to obtain the location signatures of location area A, level 2 covering both location 1 and 2 to obtain the location signatures and corresponding spatial filters.

The clustering of location signature may be performed "online" (i.e., the clustering or other processes are performed during the channel estimation or localization process when a UE is in connection with the data transmission). During online clustering, the clustering is available for use for channel estimation of a currently connected UE. Clustering of location signature may also be performed "offline" (i.e., the clustering or other processes are not performed during the data transmission with an active UE). For example, in this embodiment, the base station may perform the clustering after collecting the channel signatures. In alternative embodiments, data may be downloaded and for use with a clustering algorithm to generate the clustered signatures and corresponding filters, and subsequently upload the results to the base station. Moreover, for offline clustering, the clustering levels and coverage areas of a cluster of one level may be determined using other techniques, and then directly applied with the localization resolution having a resolution of level 2. The training may occur in real-time (online) based on the localization resolution, or based on training that occurs separately and at a different time than during localization process.

Figure 8:
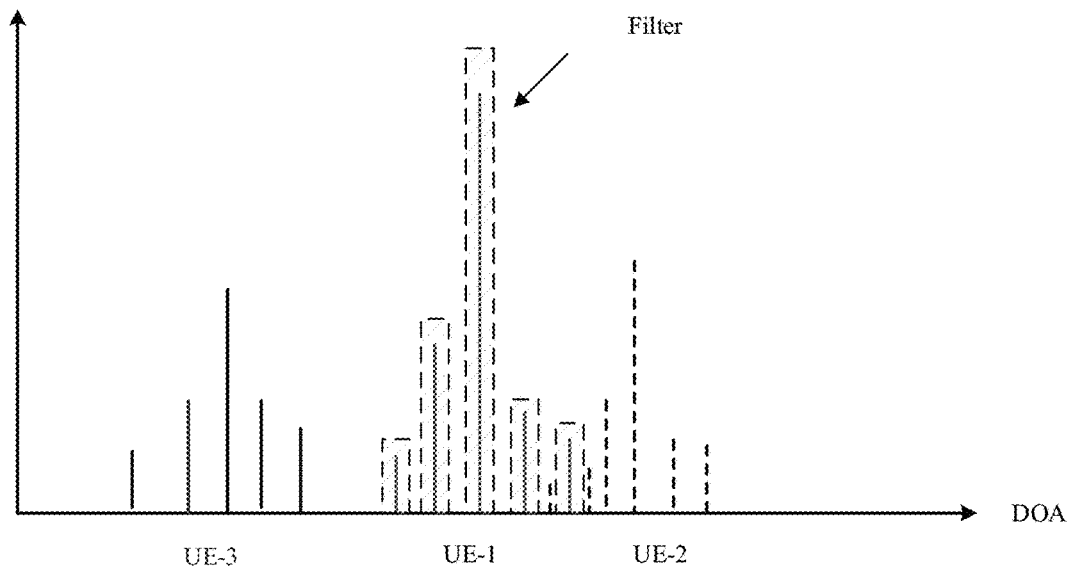
FIG. 8 illustrates the graph of FIG. 4 with application of a set of location based filtering.

FIG. 8 illustrates the graph of FIG. 4 with application of a set of location based filtering. In the embodiment, building the signature database is based on a power angle (DOA) profile (PAP) (as opposed to being based on the channel response), where the PAP is defined as $L'(x,y)=\{|h(\theta, \phi)|^2\}$. The path power depends on the attenuation of a particular path, and the transmission locations from a particular location (or region) result in a similar PAP, thereby reducing the number of sets of profiles built and stored in the signature database.

Applying PAP profiles, the mean squared error (MSE) may be obtained based on raw channel estimation for a particular location as:

$$MSE(L'(x, y)) = \sum_{h(\theta,\phi) \in L'(x,y)} ||\hat{h}(\theta, \phi)|^2 - |h(\theta, \phi)|^2|^2,$$

the MSE for all locations in $\{L(x,y)\}$ are obtained, and the minimum MSE is determined based on:

$$L^*(x,y) = \arg\min_{\{L'(x,y)\}} MSE(L'(x,y)).$$

Thus, with application of the above equations, the search space of the coverage area may be reduced using an initial subset selection based on, for example, large scale location information (i.e., initially a larger coverage area that is reduce to a smaller, more exact, coverage area). For example, with $L^*(x,y)$, the initial location information may be obtained, such that the resolution of initial localization depends on the granularity of PAP profiles in the database. It is appreciated that the minimum MSE approach for localization is a non-limiting approach, and any well-known detection method may be employed.

In an alternative embodiment, $L^*(x,y)$ may be defined as $\{|h^*(\theta, \phi)|^2\}$. Using this definition, spatial filter is provided based on $\{|h^*(\theta, \phi)|^2\}$ to improve the channel estimation performance. Thus, the detected PAP $\{|h^*(\theta,\phi)|^2\}$ may be used as the PAP of channel, or a soft limiter, scaling, and/or normalization may be applied. For example, a soft limiter of: $X'=X$ if $|X|<A$; $X'=A\angle X$ if $|X|>A$. With application of the soft limiter, the base station is able to provide better channel estimation, thereby further improving the localization.

It is appreciated that PAP is one embodiment of the signature for use in determining the location information, and any number of techniques may be used, including, but not limited, to the following techniques: DFT of $\{(h(\theta)\}$ or 2D DFT of $\{h(\theta, \phi)\}$ (channel angle spectrum); DFT of $\{|h(\theta)|^2\}$ or 2D DFT of $\{|h(\theta, \phi)|^2\}$ (power angle spectrum); spatial correlation at receive antenna (eNB end) and Vectors space of spatial correlation. Moreover, for different signatures, the detection method may be different, such as application of a vector/matrix distance (eigenspace).

Figure 9:
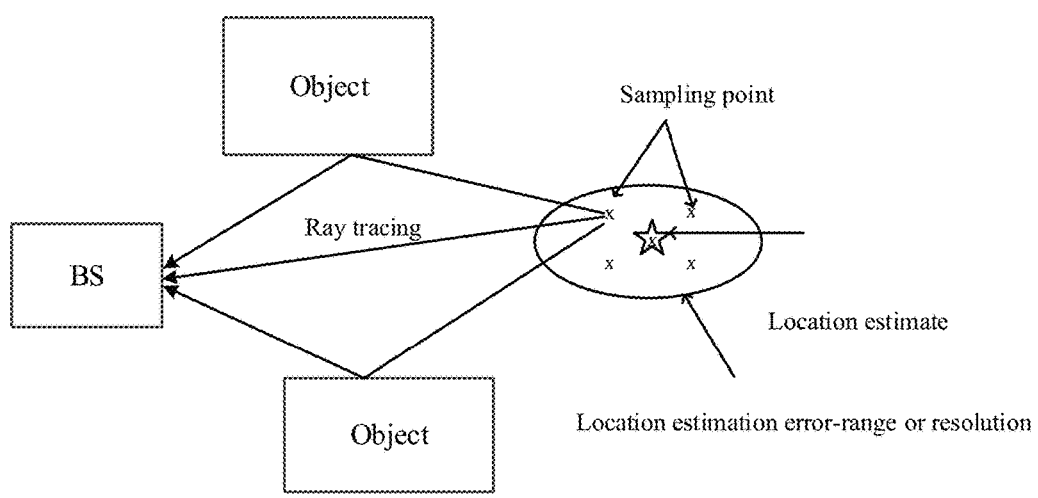
FIG. 9 illustrates a block diagram of a ray-tracing technique.

FIG. 9 illustrates a block diagram showing a ray-tracing methodology. As indicated above, the signatures may be determined based on drive tests and ray-tracing methodology. For example, in some embodiments, users can employ a ray-tracing simulator, algorithm or similar simulation to determine the optimized position of each antenna to provide the optimized location estimate. Thus, given a 3-D map, the PAP is obtained based on the ray-tracing methodology. The 3-D map may be a 3-D map of the coverage area of a base station or a larger area that could be covered by a neighboring base station. Moreover, utilizing offline processing, the 3-D map of a large area with multiple base stations may be obtained for processing with remotely located computers. Then, in one embodiment, PAP results for each base stations at any location in the 3-D map are obtained and the results uploaded to the base stations.

Ray-tracing may be accomplished by base station BS-1 (online or offline) or separately using a remotely located system, depending on the complexity of the computations. Base station computations using the ray tracing method may include, but are not limited to, 1) estimated location and error-range or resolution, drawing a certain number of sampling location points, 2) obtain the DOA signatures for every sampling point, and 3) form clustered signatures for the group and obtain the spatial angle domain filter. Remote system computations, on the other hand, may include 1) getting detailed PAP for every location (highest quantization) using ray-tracing methods, and 2) using classification/clustering methods to form the PAP signatures for a certain location area, where the clustered PAP can be formed for different levels.

In the embodiment, a signature database may be constructed to store the location signatures. The database may be formed using a machine learning approach, such as quantization and classification, where the PAP signatures for a particular locations and area are classified. Quantization techniques may include quantization of location, (x,y), DOA and ($\theta$, $\phi$), and clustering an averaging (or weighted averaging) using techniques, such as the Lloyd algorithm. Utilizing such a signature database and user location, e.g., PAP, the channel based on the user mobility and environment of location may be predicted.

In other embodiments, after the clustering, the signatures for the clustered location area, e.g., correlation matrix, may be obtained in a manner other than averaging or weighted averaging. For example, the vector space of the correlation matrix, with the clustering, the vector space is expanded, which can be obtained using singular value decomposition (SVD) of a correlation matrix after clustering instead of the average of the component vector spaces before clustering. On the other hand, for the PAP profiles, as shown in FIGS. 7B-7D, the union of the PAP profiles with combining may be taken for the locations before clustering as the PAP profiles of one location area after clustering.

Figure 10:
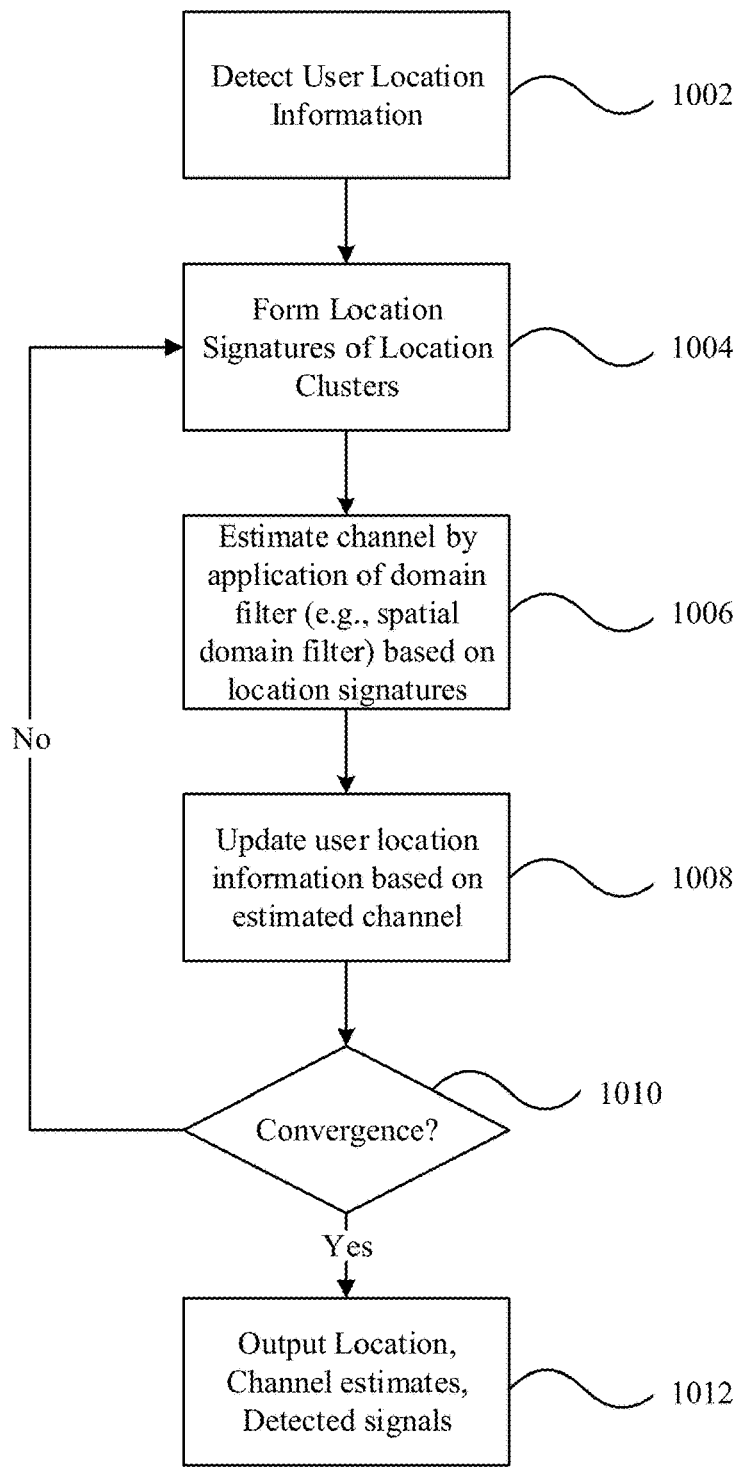
FIG. 10 is a flow diagram for calculating localization and channel estimation in accordance with FIGS. 1-9.

FIG. 10 is a flow diagram for calculating localization and channel estimation in accordance with FIGS. 1-9. The processes described herein may be implemented, for example, on wireless communication network 102 (FIG. 1) using any one or combination of components, such as the base station BS (radio network node 255) or user equipment UE. Moreover, it is appreciated that any one or more of the components described, for example, in FIG. 2 may implement the processes described herein. For example, processor 220 or processor 240 may be responsible for implementing the processes described herein.

In one non-limiting embodiment, the radio network node 255 is responsible for implementing the process of FIG. 10. At 1002, the network node 255 detects user location information from one or more user equipment UE in a geographic region 700, the geographic region comprising a location cluster (for example location A or B of level 2) of one or more location levels (for example, location 1, 2, 3 or 4 of level 1). The user location information may be detected according to well-known techniques, such as those described herein-above.

At 1004, the radio network node 255 forms a location signature profile (for example, as depicted in FIGS. 7B-7D) for each of the one or more location levels (levels 1, 2, 3 and 4) based on location signatures, generated using well-known techniques, from a corresponding one of the one or more location levels in the location cluster (location A or B, level 2). Based on the location signatures from a corresponding one of the one or more location levels in the location cluster, the radio network node 255 generates a filter (for example, a spatial filter based on the location signatures) for each of the one or more location levels. It is also appreciated that the location signatures and filter may be previously generated based on information stored in a location database, as explained above.

The network node 255, at 1006, then estimates a channel by applying the generated filter that matches a location level of the location user information. For example, with reference to FIGS. 7B-7D, a spatial filter corresponding to a location and level may be applied to estimate the channel. As explained above, the spatial filter may be selected by the radio network node 255 as a result of calculations (e.g., OTDOA) based on the received signal quality form the user equipment UE in the geography region 700. That is, based on the resolution or accuracy of location information/estimation in one iteration, the spatial filter of the level that matches the location resolution or accuracy may be applied. Moreover, with each iteration of refined location information, a more specific spatial filter may be applied.

After the radio network node estimates the channel at 1006, the radio network node 255 updates the user location information, at 1008, to reflect the calculations of the estimated channel and iterates 1004-1008 until the user location information converges with a predetermined convergence value (e.g., a selected amount of convergence is detected), as determined by the radio network node 255 at 1010. The process of estimating the channel, reconstructing the location signatures and using that as feedback for noise and interference cancellation is iteratively repeated until a desired number of iterations are complete or a desired accuracy is achieved. For example, in one embodiment, the process is iteratively repeated until the user location information converges with a predetermined convergence value (e.g., a selected amount of convergence is detected). Thus, channel estimation performance improves with each iteration.

In an alternative embodiment, 1006 and 1008 may be pre-determined based on long term training or a drive test. In this case, the iteration process will be, for example, 1002, 1006, and 1008 (the forming of location signatures and generating of filters is learned separately). Thus, using the detected user location information 1002, the location detection resolution (localization levels) is known and the location signature and corresponding filter may be retrieved from the database based on the output of 1002.

The location, channel estimates and detected signals may then be output at 1012.

Figure 11:
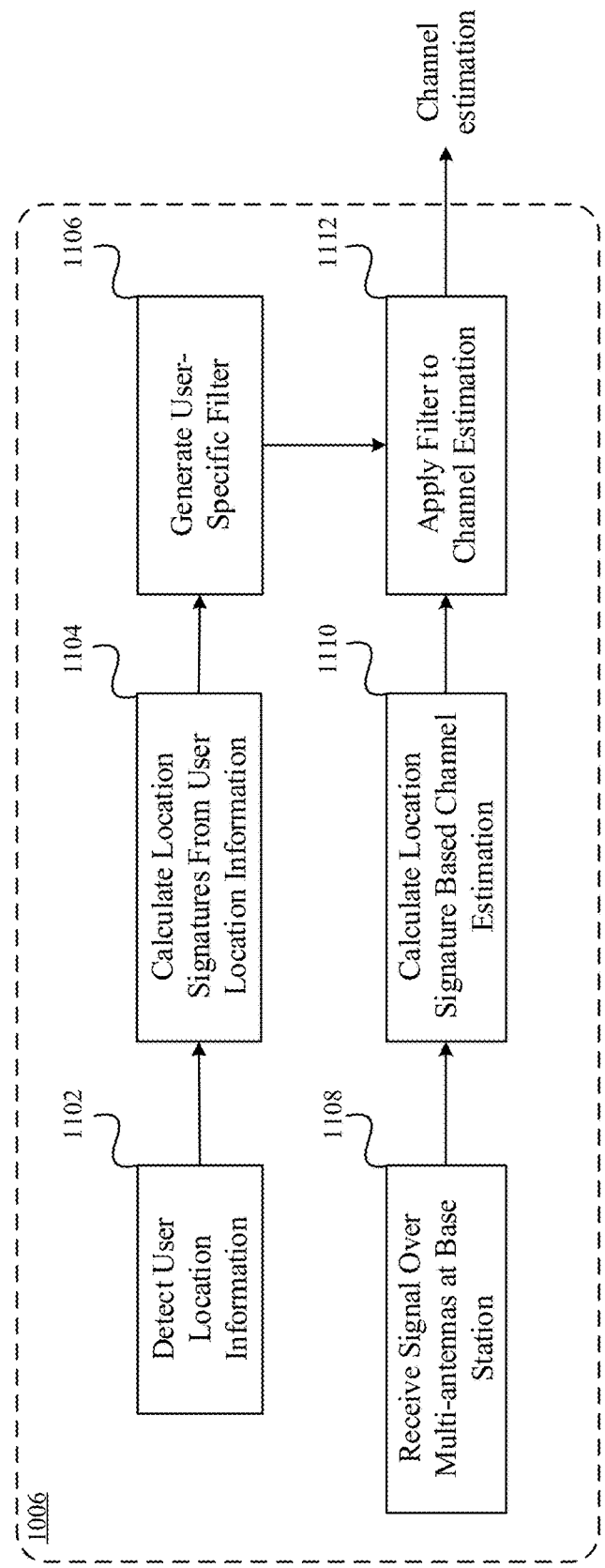
FIG. 11 is a flow diagram for calculating channel estimation implemented in accordance with FIG. 10.

FIG. 11 is a flow diagram for calculating channel estimation implemented in accordance with FIG. 10. At 1102, the radio network node 255 detects location information from user equipment UE to calculate the location signatures at 1104. Calculation of the location signatures, as described above may employ any well-known technique, such as DFT steering, MVDR, MUSIC, ray-tracing, self-training, etc. The signatures are then used to generate user-specific filters, at 1106, which will be applied as part of the channel estimation. The radio network node 255 may also receive the user equipment UE signals via the multiple antennas 210 at 1108. The received signals are used to calculate the location signatures to be used in channel estimation at 1110 and to apply the filter for channel estimation at 1112, as described above.

FIGS. 12A-12C and 13A-13C illustrate simulation results when applying the filter in accordance with the disclosed embodiments. The simulation results are based on an antenna setting of ULA with $M_T$=128, 64 and a number of users of K=3. Channel characteristics include a single scattering ring of DOA center angle θ, radius Δ and a correlation of:

$$[R]_{m,p} = \frac{1}{2\Delta}\int_{-\Delta+\theta}^{\Delta+\theta} e^{-j2\pi D(m-p)\sin(\alpha)} d\alpha,$$

where D is the normalized antenna spacing, D-d/λ.

Figure 12A:
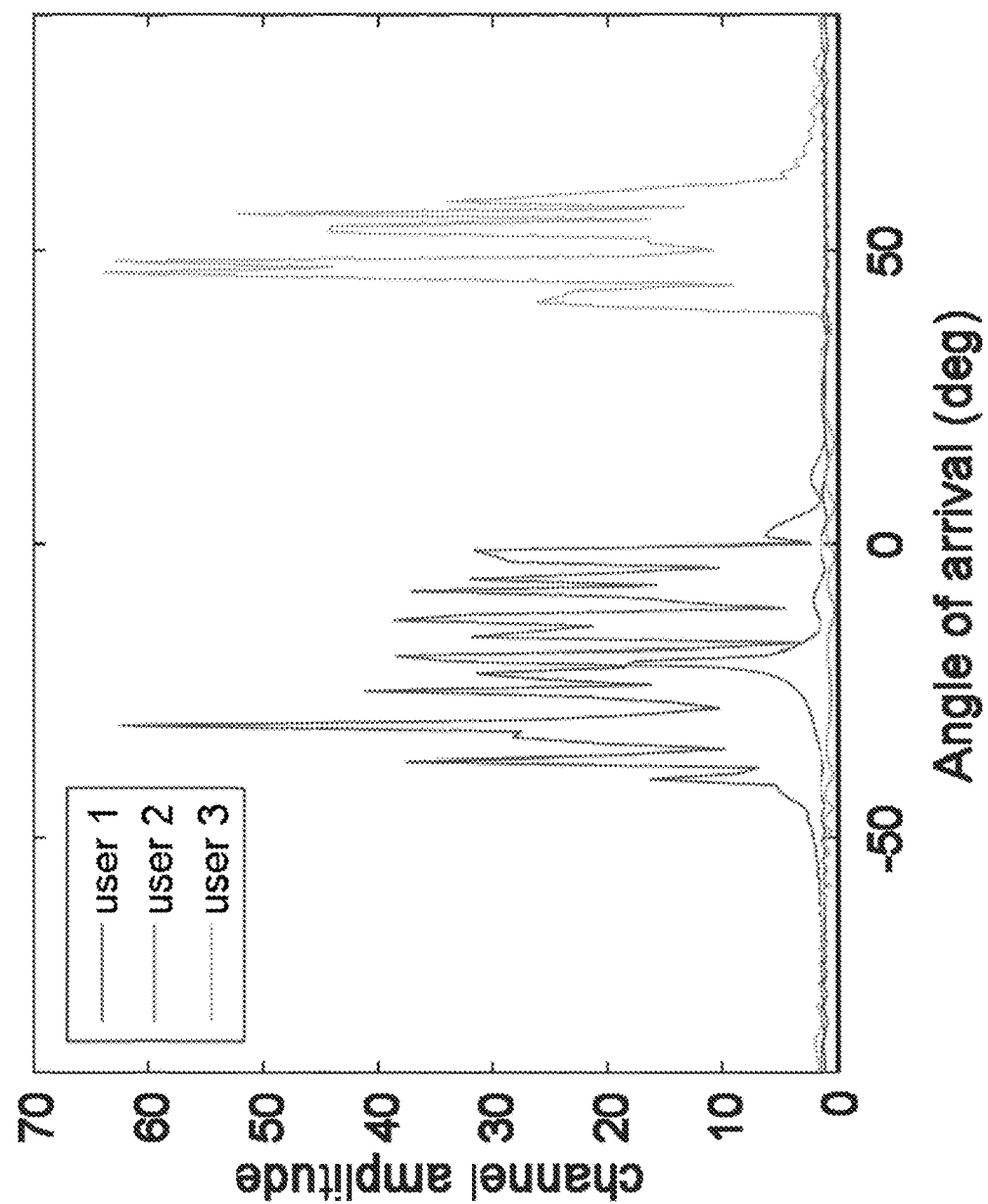
FIGS. 12A-12C illustrate simulation results when applying the filter in accordance with the disclosed embodiments.
Figure 12B:
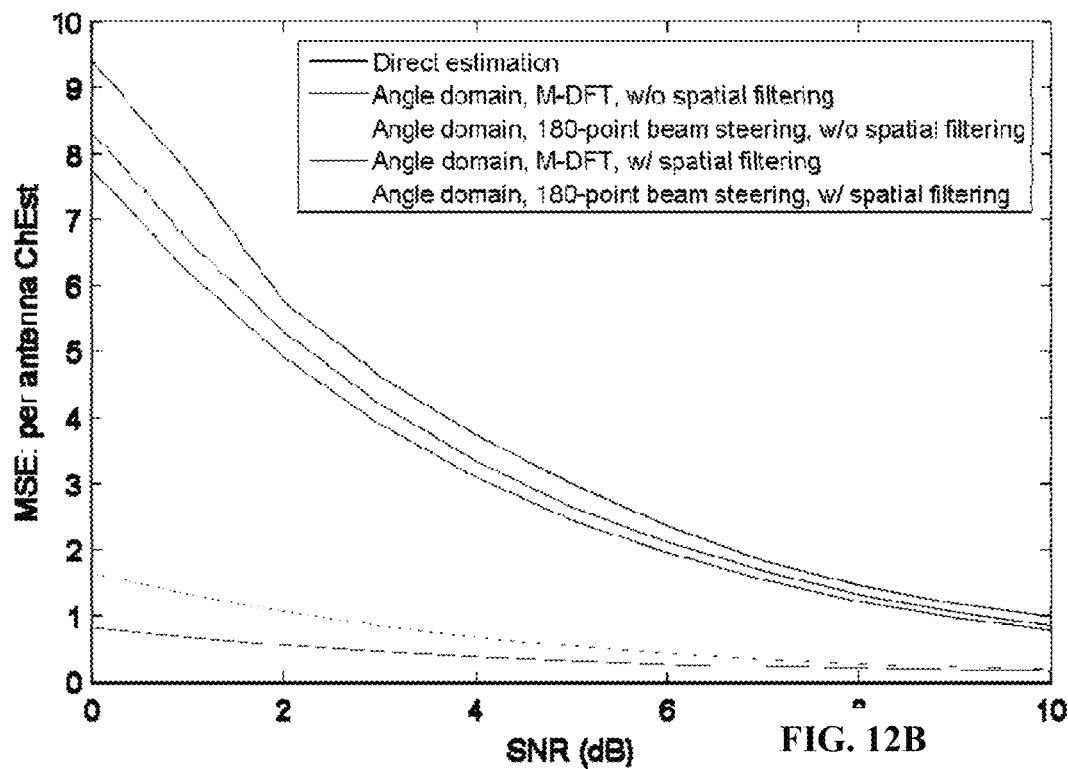
Figure 12C:
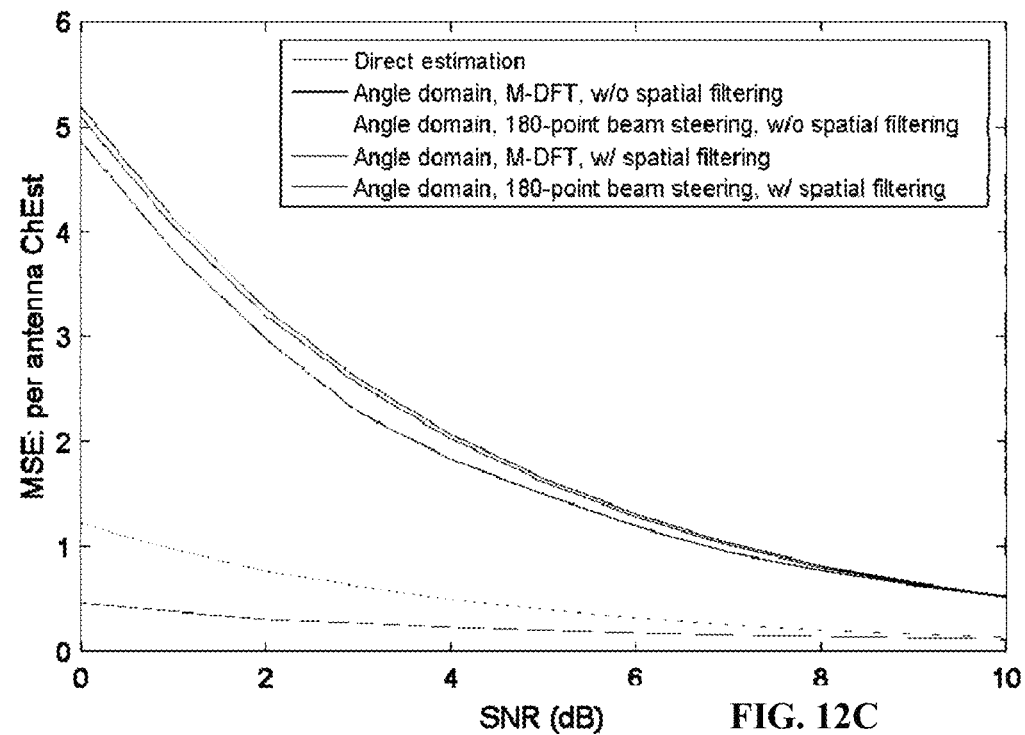
Figure 13A:
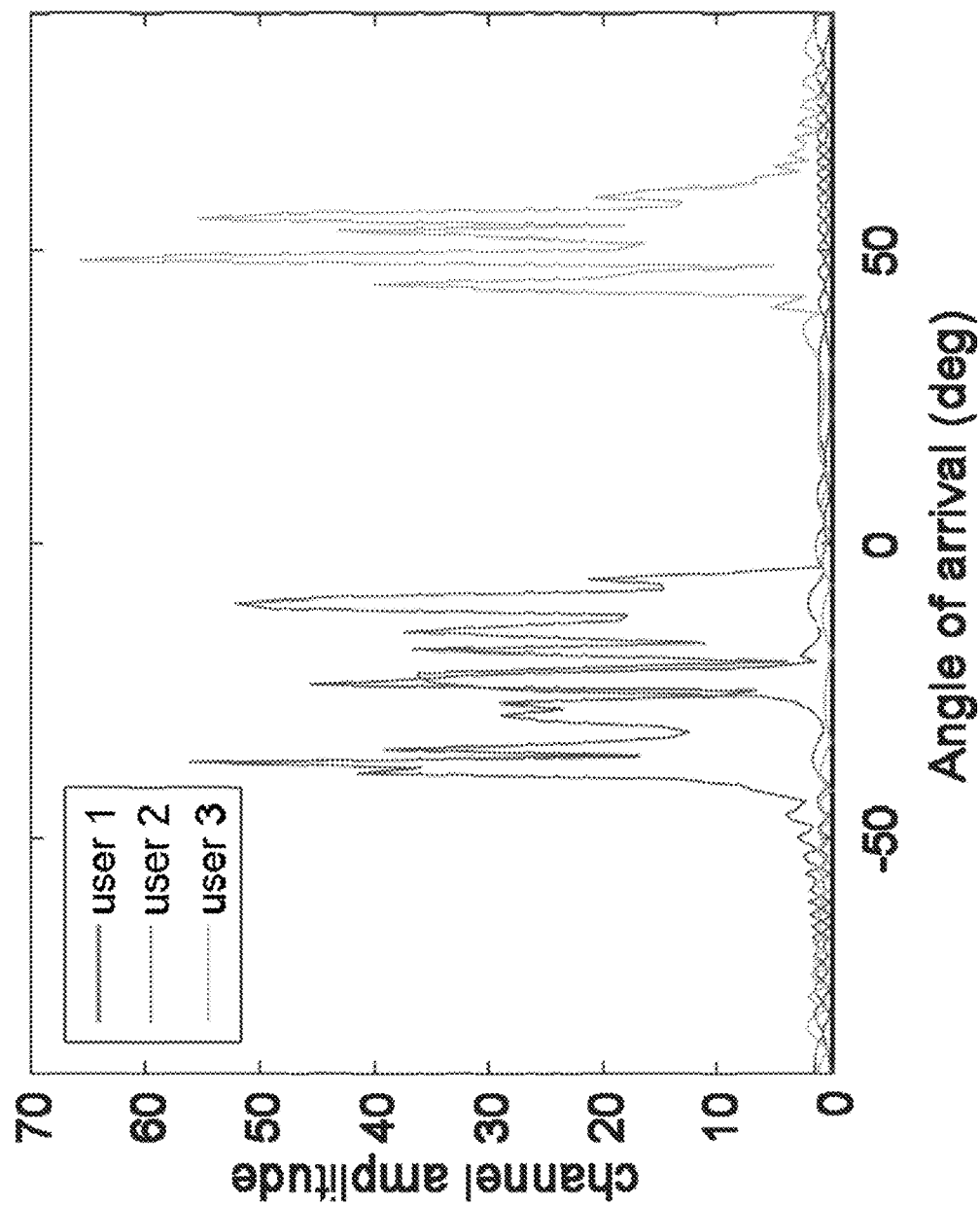
FIGS. 13A-13C illustrate simulation results when applying the filter in accordance with the disclosed embodiments.
Figure 13B:
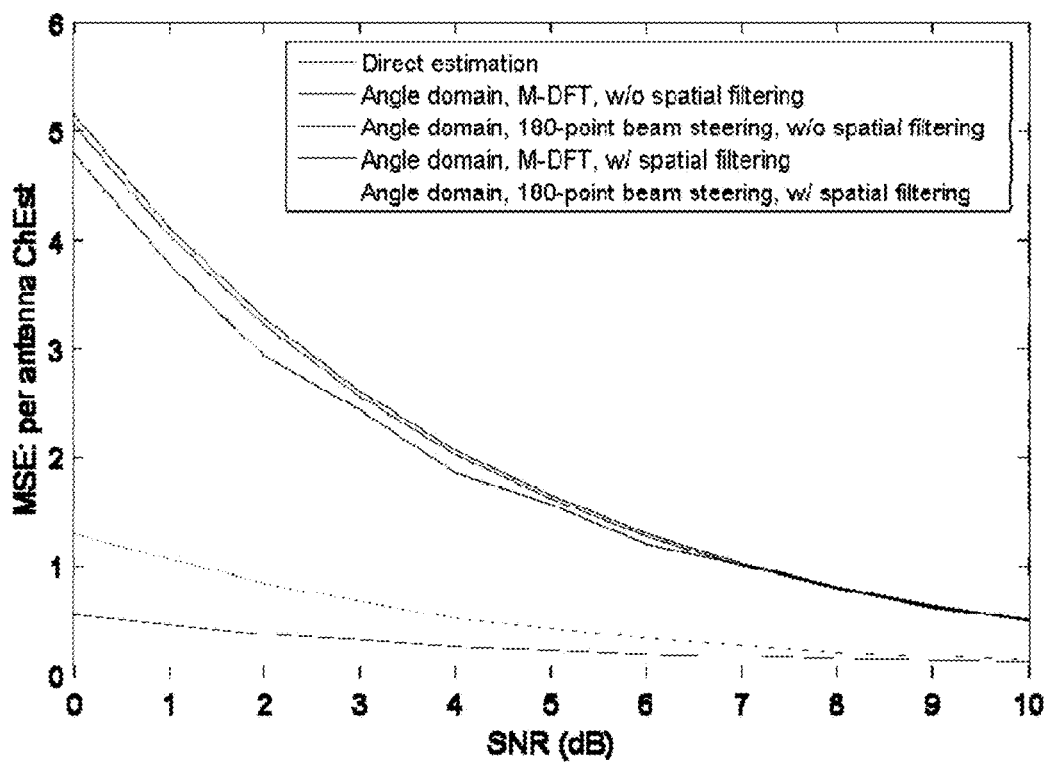
Figure 13C:
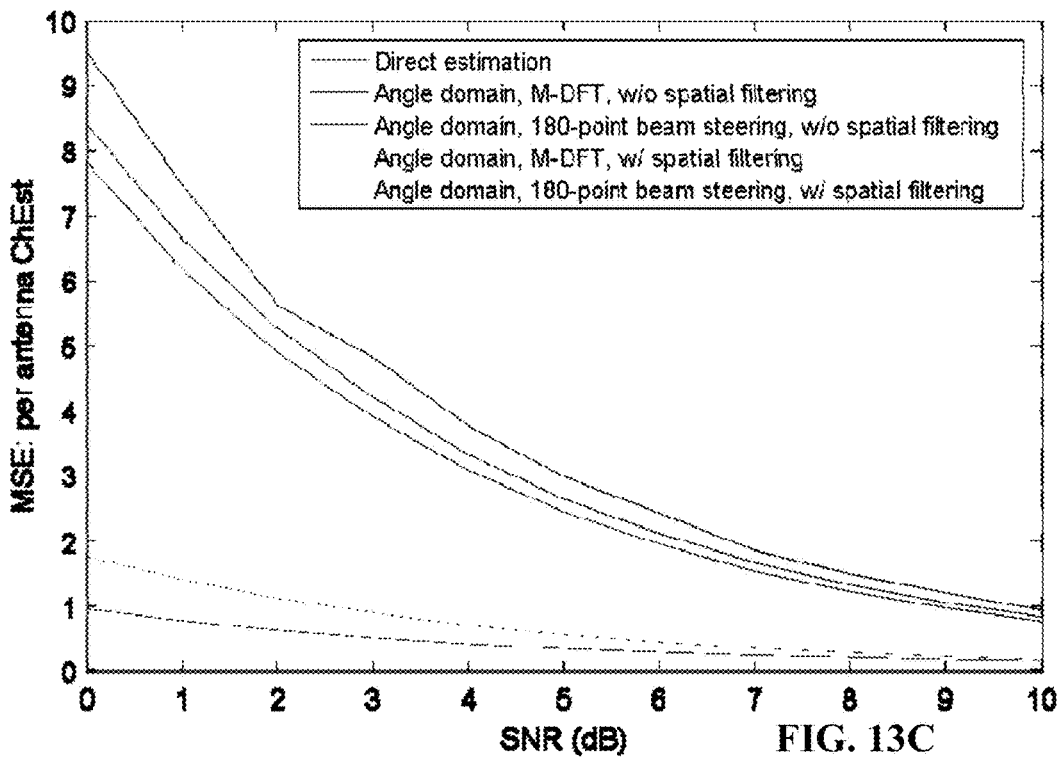

In FIG. 12A, the single scattering ring of DOA center angle θ is equal to [−30−10 50], Δ=[10 10 10], where the channel realization in the beaming domain is M=128. The average MSE performance over per antenna channel estimates are shown in FIGS. 12B and 12C. Similar results are shown in FIGS. 13A-13C with the single scattering ring of DOA center angle θ is equal to [−30 −15 10], Δ=[10 10 10].

Figure 14:
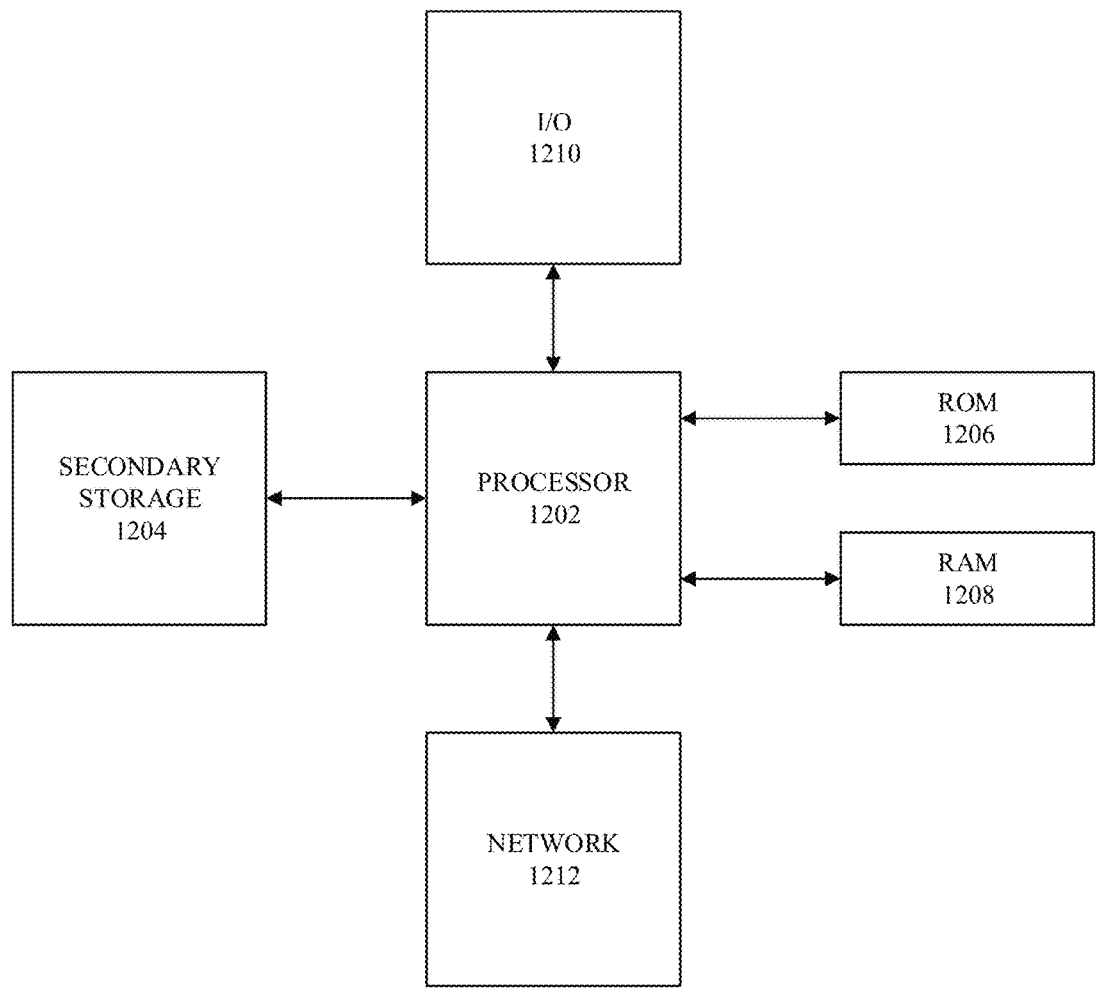
FIG. 14 illustrates a block diagram of a network system that can be used to implement various embodiments.

The schemes described above may be implemented on any general-purpose network component, such as a computer or network component with sufficient processing power, memory resources, and network throughput capability to handle the necessary workload placed upon it. FIG. 14 illustrates a schematic diagram of a general-purpose network component or computer system. The general-purpose network component or computer system 1200 includes a processor 1202 (which may be referred to as a central processor unit or CPU) that is in communication with memory devices including secondary storage 1204, and memory, such as ROM 1206 and RAM 1208, input/output (I/O) devices 1210, and a network 1212, such as the Internet or any other well-known type of network, that may include network connectively devices, such as a network interface. Although illustrated as a single processor, the processor 1202 is not so limited and may comprise multiple processors. The processor 1202 may be implemented as one or more CPU chips, cores (e.g., a multi-core processor), FPGAs, ASICs, and/or DSPs, and/or may be part of one or more ASICs. The processor 1202 may be configured to implement any of the schemes described herein, including the processes described with reference to FIGS. 10 and 11. The processor 1102 may be implemented using hardware, software, or both.

The secondary storage 1204 is typically comprised of one or more disk drives or tape drives and is used for non-volatile storage of data and as an over-flow data storage device if the RAM 1108 is not large enough to hold all working data. The secondary storage 1204 may be used to store programs that are loaded into the RAM 1208 when such programs are selected for execution. The ROM 1206 is used to store instructions and perhaps data that are read during program execution. The ROM 1206 is a non-volatile memory device that typically has a small memory capacity relative to the larger memory capacity of the secondary storage 1204. The RAM 1208 is used to store volatile data and perhaps to store instructions. Access to both the ROM 1206 and the RAM 1208 is typically faster than to the secondary storage 1204. At least one of the secondary storage 1204 or RAM 1208 may be configured to store routing tables, forwarding tables, or other tables or information disclosed herein.

It is understood that by programming and/or loading executable instructions onto the node 255, the processor 220 or the memory 225 are changed (individually or collectively referred to as computer readable media, medium or storage), transforming the node 255 in part into a particular machine or apparatus, e.g., a radio network node, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The present disclosure provides, among others, the following advantages. Channel estimation performance may be improved by removing the pilot contamination (the distortion introduced by the pilot reuse in the neighboring cell or in the serviced cell), and mean square error (MSE) of the channel estimate may be significantly reduced. Additionally, the uplink pilots may be spatially reused.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method by a radio network node, for generating an improved channel estimate in a communication system between a user equipment and a radio network node, comprising:

detecting user location information, from one or more user equipment in a geographic region, the geographic region comprising a location cluster comprising a first location level and a second location level;

forming a location signature profile for the first location level and the second location level respectively, based on location signatures of the first and second location levels in the location cluster;

generating a filter for each of the first location level and the second location level respectively, to remove noise or interference, with a location region corresponding to the second location level including the location regions corresponding to at least two of the first location levels;

reducing a mean square error of a channel estimate by applying each of the filters corresponding to the first and second location levels to generate the improved channel estimate; and outputting the improved channel estimate.

2. The method of claim 1, wherein the filter is a spatial domain filter and the location signature is a direction of arrival (DOA) signature.

3. The method of claim 1, wherein the filter is a joint spatial filter for the location cluster based on a combination of the location signatures from each of the one or more location levels in the location cluster.

4. The method of 2, wherein the DOA signatures from each of the one or more location levels are formed by one of power angle profile (PAP), DFT steering, spatial correlation, and vector space of spatial correlation.

5. The method of 1, wherein the filter corresponding to the location signature are selected based on ray-tracing.

6. The method of claim 1, further comprising generating a database of location signatures for each location cluster, where location ranges are based on properties of the geographic region.

7. The method of claim 6, wherein the generating of the database comprises:

classifying a power angle profile (PAP) signature and the location signature of the geographic region, quantizing the geographic region of each location level and corresponding location signature, and clustering and averaging the PAP and location signatures, wherein the location signature is a direction of arrival (DOA) signature.

8. The method of claim 2, wherein the spatial domain filter is defined as $$w = [w_1, \ldots, w_N]$$
$$w_k = \begin{cases} 1, & \phi_k \in \Theta \\ 0, & \phi_k \notin \Theta \end{cases},$$

where $\Theta$ is the DOA signature set for a user for a range of $\Theta=\{\Theta|\Theta_{min}<\Theta<\Theta_{max}\}$.

9. The method of claim 1, wherein the radio network node comprises a multiple antenna array configured for one or more of beamforming, spatial multiplexing and Multiple Input Multiple Output (MIMO) transmission.

10. The method of claim 1, further comprising retrieving the location signatures and filters from a database based on location detection of the user equipment in the geographic region.

11. A node for generating an improved channel estimate in a communication system, comprising:
a memory storage comprising instructions; and
one or more processors coupled to the memory that execute the instructions to:
detect user location information from one or more user equipment in a geographic region, the geographic region comprising a location cluster comprising a first location level and a second location level;
form a location signature profile for the first location level and the second location level respectively, based on location signatures of the first and second location levels in the location cluster;
generate a filter for each of the first location level and the second location level respectively, to remove noise or interference, with a location region corresponding to the second location level including the location regions corresponding to at least two of the first location levels,
reducing a mean square error of a channel estimate by applying each of the filters corresponding to the first and second location levels to generate the improved channel estimate; and
outputting the improved channel estimate.

12. The node of claim 11, wherein the filter is a spatial domain filter and the location signature is a direction of arrival (DOA) signature.

13. The node of claim 11, wherein the filter is a joint spatial filter for the location cluster based on a combination of the location signatures from each of the one or more location levels in the location cluster.

14. The node of 12, wherein the DOA signatures from each of the one or more location levels are formed by one of power angle profile (PAP), DFT steering, spatial correlation, and vector space of spatial correlation.

15. The node of claim 11, wherein the filter corresponding to the location signature are selected based on ray-tracing.

16. The node of claim 11, the one or more processors further executing the instructions to generate a database of location signatures for each location cluster, where location ranges are based on properties of the geographic region.

17. The node of claim 16, wherein the generating of the database comprises
classifying a power angle profile (PAP) signature and the location signature of the geographic region,
quantizing the geographic region of each location level and corresponding location signature, and
clustering and averaging/the PAP and location signatures, wherein the location signature is a direction of arrival (DOA) signature.

18. The node of claim 12, wherein the spatial domain filter is defined as $$w = [w_1, \ldots, w_N]$$
$$w_k = \begin{cases} 1, & \phi_k \in \Theta \\ 0, & \phi_k \notin \Theta \end{cases},$$

where $\Theta$ is the DOA signature set for a user for a range of $\Theta=\{\Theta|\Theta_{min}<\Theta<\Theta_{max}\}$.

19. A non-transitory computer-readable medium storing computer instructions for generating an improved channel estimate in a communication system between a user equipment and a radio network node, that when executed by one or more processors, perform the steps of:
detecting user location information from one or more user equipment in a geographic region, the geographic region comprising a location cluster comprising a first location level and a second location level;
forming a location signature profile for the first location level and the second location level respectively, based on location signatures of the first and second location levels in the location cluster;
generating a filter for each of the first location level and the second location level respectively, to remove noise or interference, with a location region corresponding to the second location level including the location regions corresponding to at least two of the first location levels;
reducing a mean square error of a channel estimate by applying each of the filters corresponding to the first and second location levels to generate the improved channel estimate; and
outputting the improved channel estimate.

20. The non-transitory computer-readable medium of claim 19, wherein the filter is a joint spatial filter for the location cluster based on a combination of the location signatures from each of the one or more location levels in the location cluster.

21. The non-transitory computer-readable medium of claim 20, wherein the spatial domain filter is defined as $$w = [w_1, \ldots, w_N]$$
$$w_k = \begin{cases} 1, & \phi_k \in \Theta \\ 0, & \phi_k \notin \Theta \end{cases},$$

where $\Theta$ is the DOA signature set for a user for a range of $\Theta=\{\Theta|\Theta_{min}<\Theta<\Theta_{max}\}$.

22. The method of claim 1, before outputting the improved channel estimate, the further comprising:
updating, by the base station, based on the improved channel estimate, the user location information, and repeating the steps of claim 1 until the user location information converges with a predetermined convergence value.

23. The node of claim 11, wherein the one or more processors coupled to the memory that execute the instructions to do the following before outputting the improved channel estimate, the further comprising:
updating, by the base station, based on the improved channel estimate, the user location information, and repeating the steps of claim 11 until the user location information converges with a predetermined convergence value.

24. The non-transitory computer-readable medium of claim 19, wherein before outputting the improved channel estimate, the non-transitory computer-readable medium further perform the steps of:
(e) updating, by the base station, based on the improved channel estimate, the user location information, and repeating the steps of claim 19 until the user location information converges with a predetermined convergence value.

* * * * *